Sept. 4, 1962 W. A. KUHAR ETAL 3,052,769

FUSIBLE PLUG-IN DEVICE

Original Filed Aug. 6, 1956 6 Sheets-Sheet 1

INVENTORS
William A. Kuhar
Forrest H. Seiple
BY
[signature]
ATTORNEYS

INVENTORS
William A. Kuhar
Forrest H. Seiple
BY
ATTORNEYS.

Sept. 4, 1962 W. A. KUHAR ETAL 3,052,769

FUSIBLE PLUG-IN DEVICE

Original Filed Aug. 6, 1956 6 Sheets-Sheet 3

INVENTORS
William A. Kuhar
Forrest H. Seiple
BY
[signature]
ATTORNEYS

INVENTORS.
William A. Kuhar
Forrest H. Seiple
BY
[signature]
ATTORNEYS.

Sept. 4, 1962 W. A. KUHAR ETAL 3,052,769

FUSIBLE PLUG-IN DEVICE

Original Filed Aug. 6, 1956 6 Sheets-Sheet 5

INVENTORS
William A. Kuhar
Forrest H. Seiple
BY
ATTORNEYS

INVENTORS
William A. Kuhar
Forrest H. Seiple
BY
ATTORNEYS

United States Patent Office 3,052,769

Patented Sept. 4, 1962

3,052,769

FUSIBLE PLUG-IN DEVICE

William Anthony Kuhar, Bethlehem, and Forrest Howard Seiple, Allentown, Pa., assignors, by mesne assignments, to Uni-Bus, Inc., Allentown, Pa., a corporation of Delaware Continuation of original application Ser. No. 602,244, Aug. 6, 1956. This application Apr. 23, 1958, Ser. No. 731,174

15 Claims. (Cl. 200—51)

The present invention relates to plug-in devices of the character which interconnect from a bus duct with a load, lateral bus duct stretch, circuit breaker, switchboard, panel board, motor control center or the like.

The present application is a continuation of our copending application Serial No. 602,244, filed August 6, 1956, now abandoned, for Fusible Plug-In Device.

A purpose of the present invention is to improve the safety of interconnection to a bus duct.

A further purpose is to assure that all arcing in opening secondary contacts is extinguished before primary contacts connecting to a bus duct can be opened.

A further purpose is to provide an intermediate opening position limited by an operation stop at which suitably double break secondary contacts are fully open, and to establish stopping of the operating parts against that operation stop before further opening is permitted, for example, as by opening of the cover.

A further purpose is to lock the operating mechanism against opening of the cover while the secondary contacts are closed.

A further purpose is to lock the mechanism against closing the contacts while the cover is open.

Further purposes appear in the specification and in the claims.

In the drawings we have chosen to illustrate a few only of the numerous embodiments in which the invention may appear, selecting the forms shown from the standpoints of convenience in illustration, satisfactory operation and clear demonstration of the principles involved.

In FIGURE 5 the bus duct is shown partially broken away.

FIGURE 8 is a view similar to FIGURE 3.

FIGURE 9 is a view similar to FIGURE 5.

FIGURE 10 is a fragmentary section on the line 10—10 of FIGURE 9.

FIGURE 11 is a fragmentary section on the line 11—11 of FIGURE 8.

Figure 1:
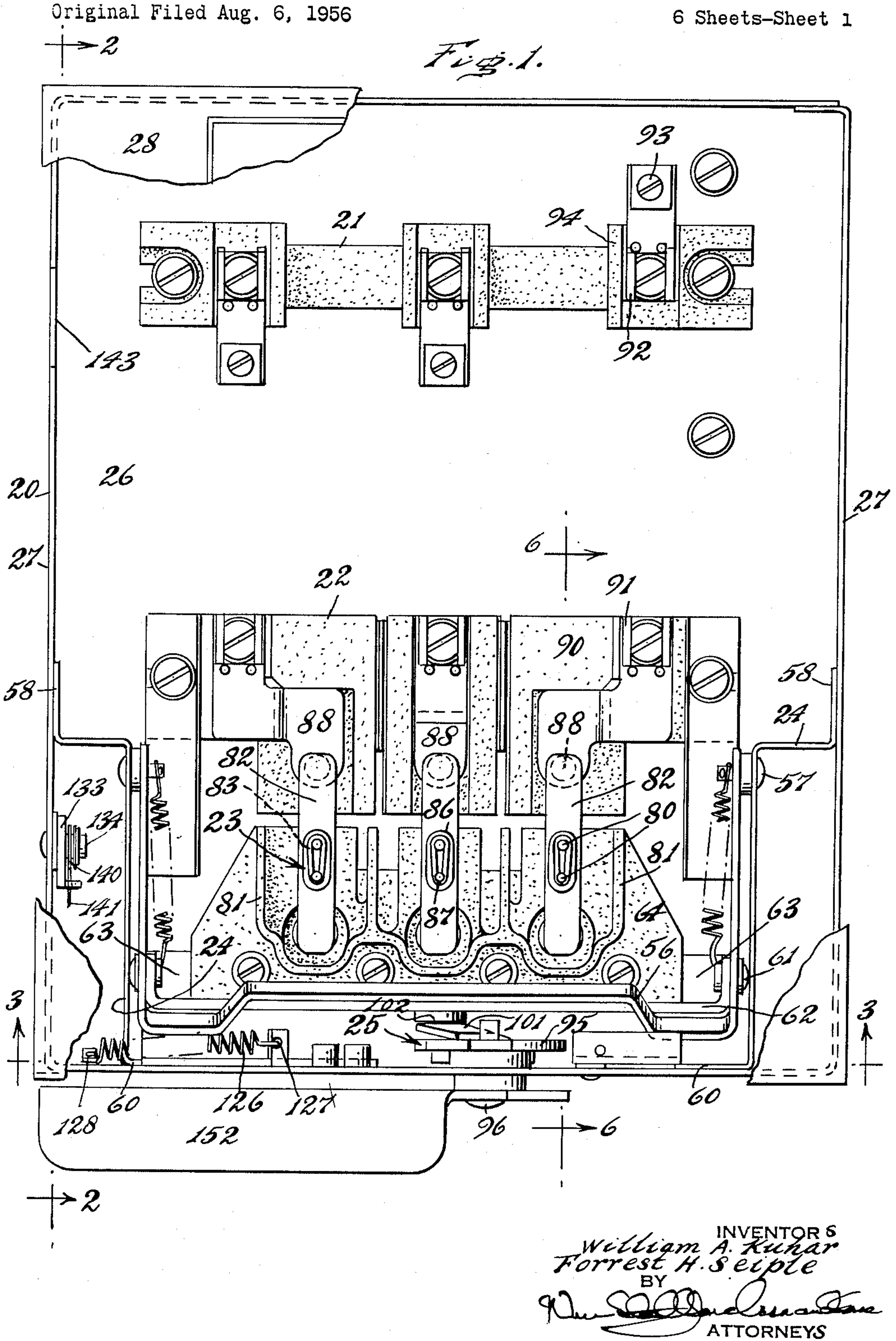
FIGURE 1 is a plan view with the cover partially broken away showing the device in closed position.
Figure 2:
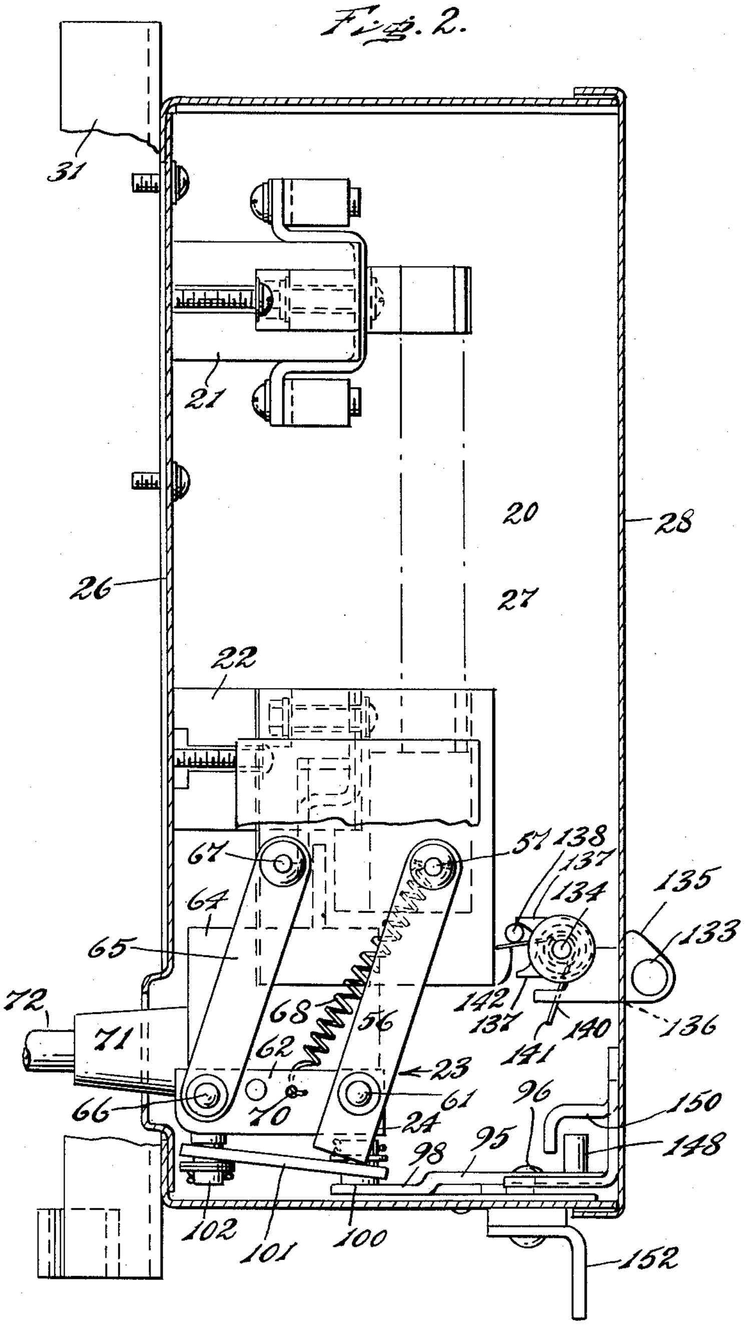
FIGURE 2 is a section on the line 2—2 of FIGURE 1.
Figure 3:
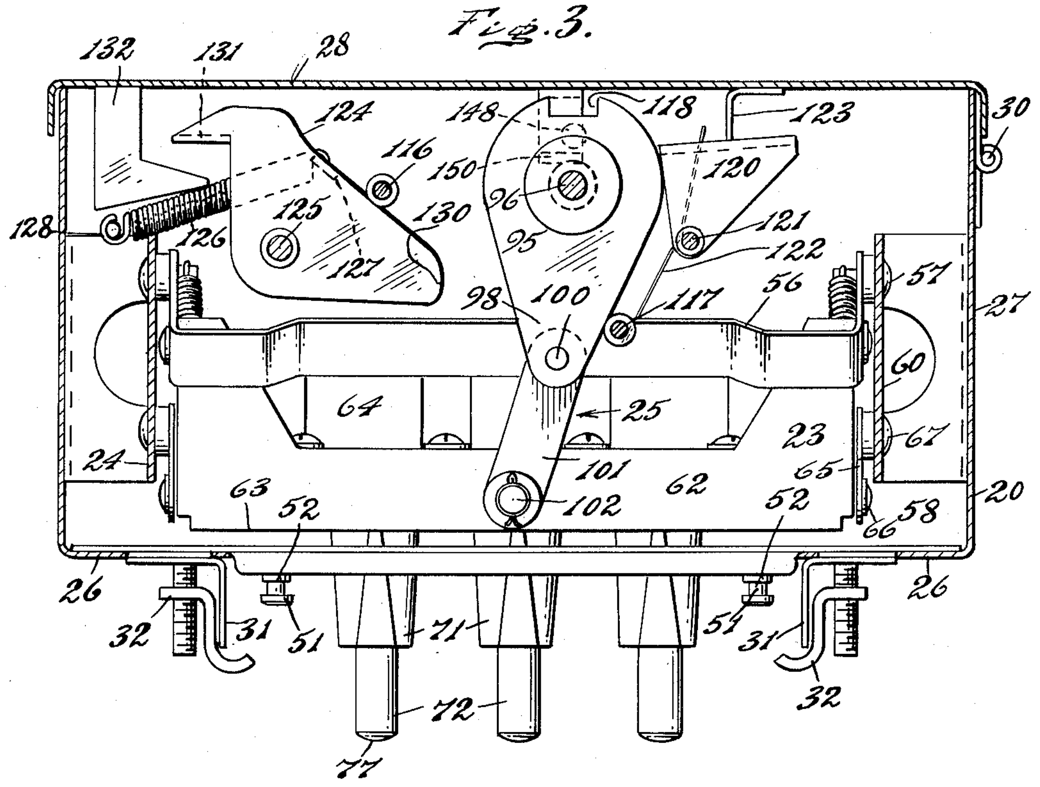
FIGURE 3 is a section on the line 3—3 of FIGURE 1 in a closed position.
Figure 4:
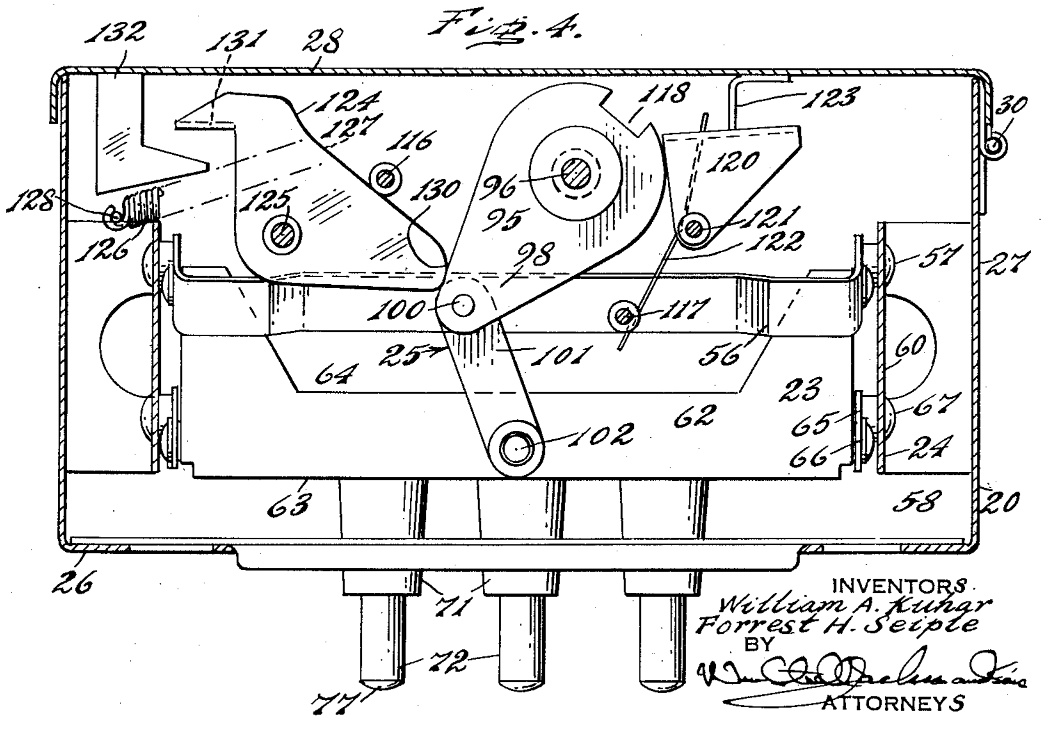
FIGURE 4 is a view similar to FIGURE 3 showing the mechanism retracted to engage the operation stop.

In the prior art there has been considerable danger incident to connecting a load or other take-off circuit to the bus bars of a bus duct. The problem has been complicated by the fact that the bus duct is often located near the ceiling and sometimes rendered inaccessible by the presence of structural members or intervening equipment.

The present invention assures that adequate safety precautions must be taken in making the connection of a plug-in device to the bus duct.

The following safety features are present:

(1) It is not possible to open the slide and therefore gain access of the primary contacts to the bus duct until the plug-in device is in position covering the access opening and thus preventing the operator from bringing his hand or other part of his body into contact with the bus duct.

Likewise it is not possible to detach the plug-in device from the bus duct until the slide has been closed and the access opening is closed, at the same time assuring that the primary contacts must have been withdrawn from the bus duct and out of contact with the bus bars.

(2) The cover of the plug-in device must be closed before the secondary contacts and primary contacts can be closed, so that the operator is protected against contact with any electrically energized interior components of the plug-in device.

(3) The operator cannot close the primary and secondary contacts if he has the cover open, for example, for the purpose of wiring the load side terminals or inspecting or replacing fuses.

(4) When the operator manipulates the handle to open the contacts and throw the operating cam, he merely opens the double-break secondary contacts, whereas the operation stop prevents the cam from opening far enough to open the primary contacts. This assures that any arcing and associated transients will be terminated prior to the time when the primary contacts are open. It is even necessary for the operator to open the cover in order to cause the primary contacts to open. This assures that when the operator goes into the box for any purpose, the exposed ends of the primary contacts will be deenergized, as well as all the other current carrying components within the enclosure.

In accordance with the present invention, the movable secondary contacts, and the primary contacts are mounted on an insulating movable contact carrier, the insulating movable contact carrier having three positions. In the forward position the primary contacts are engaged with the bus bar, the primary contacts being strongly urged against the bus bar. At the same time the secondary contacts are strongly urged against the primary contacts and also against fixed contacts. The insulating movable contact carrier and associated parts are held in this forward position by the action of a toggle formed between the rocker arm of the operating cam and a link. As soon as the cover is closed the operation stop is in operative position, two interlocks with the cover are effective while one is rendered inoperative. One interlock with the cover prevents opening the cover while the cam is in forward position. Another interlock with the cover is engaged behind the operation stop so that opening of the cover when permitted would release the operation stop. The third interlock is released so that the cam can be manipulated.

When now the cam is thrown to its opposite limited position either by rotating its handle or by sliding its handle, the toggle passes beyond dead center and the insulating movable contact carrier retracts under the action of its springs far enough to permit the double break secondary contacts to open. Further opening of the cam is prevented by the operation stop.

In this position one interlock with the cover is effective and two are inoperative. One of the interlocks which operates only when the cam is fully forward is released, and the other interlock which operates only when the cam is fully in rearward position is inactive. The third interlock which works on the operation stop is still engaged behind the operation stop.

Now, in order to open the primary contacts, it is necessary to open the cover, releasing the cover latch. When this happens the operation stop is released, the cam fully releases and the insulating movable contact carrier fully retracts, releasing the primary contacts from engagement with the bus bar. The device is fully deenergized and the operator can touch current carrying parts in the enclosure with safety.

In accordance with the present invention, considering first FIGURES 1 to 7 inclusive, the plug-in device of the invention comprises an enclosure 20, fixedly mounting in spaced relation at its interior a load side fuse insulator block 21, a line side fuse insulator block 22, and a contact carrier assembly 23 movably mounted on pantograph supports 24. The contact carrier assembly is manipulated by an operating linkage 25.

In the preferred embodiment, the enclosure includes a back metallic wall 26, lateral metallic walls 27, and a cover 28 hinged to one of the lateral walls at 30, closing the otherwise open face of the enclosure.

Figures 5, 7:
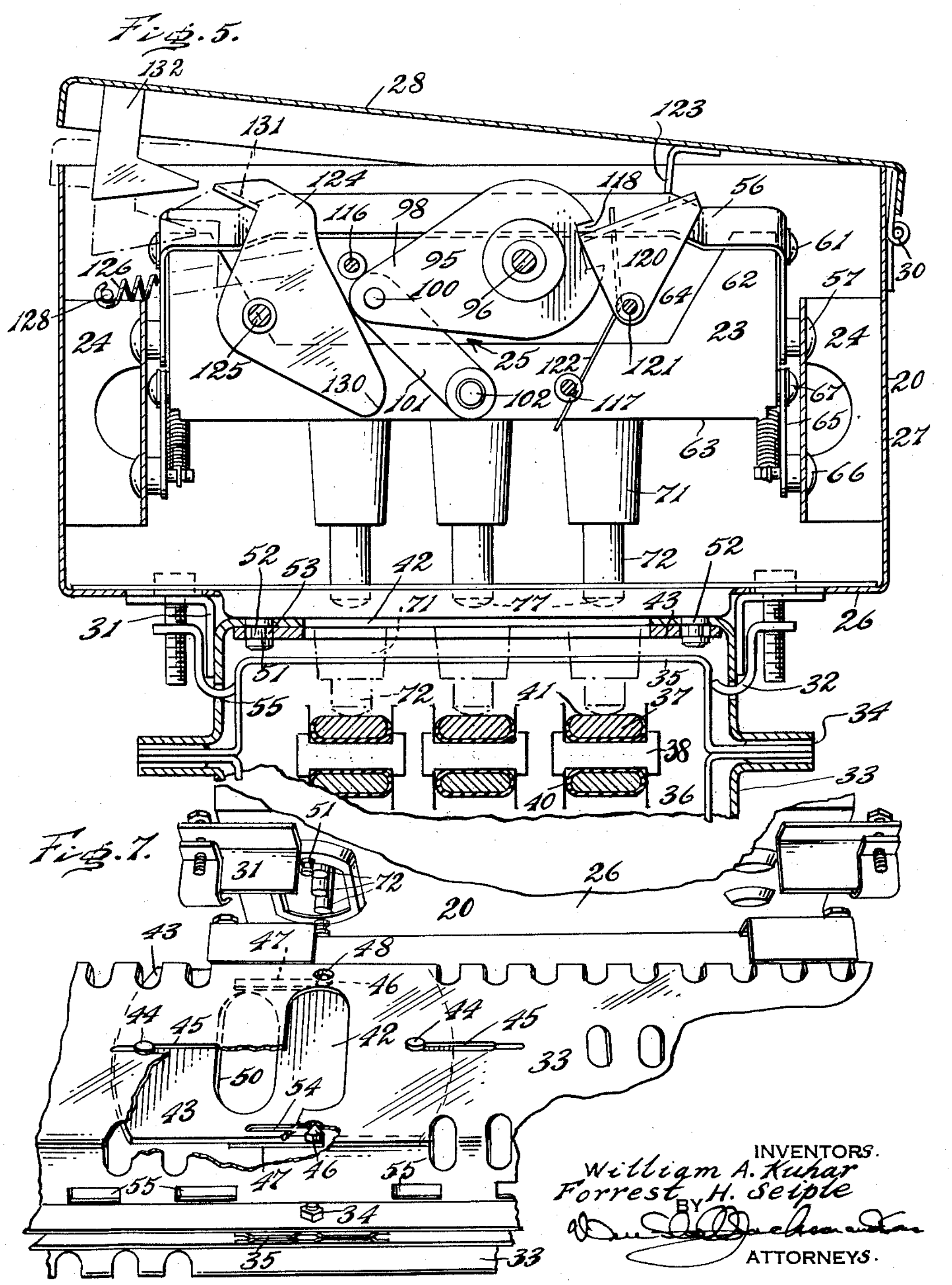
FIGURE 5 is a view similar to FIGURE 3 showing the mechanism fully retracted, and the cover partially open.
FIGURE 7 is a fragmentary perspective showing the bus duct and the plug-in device about to be interconnected.
Figure 6:
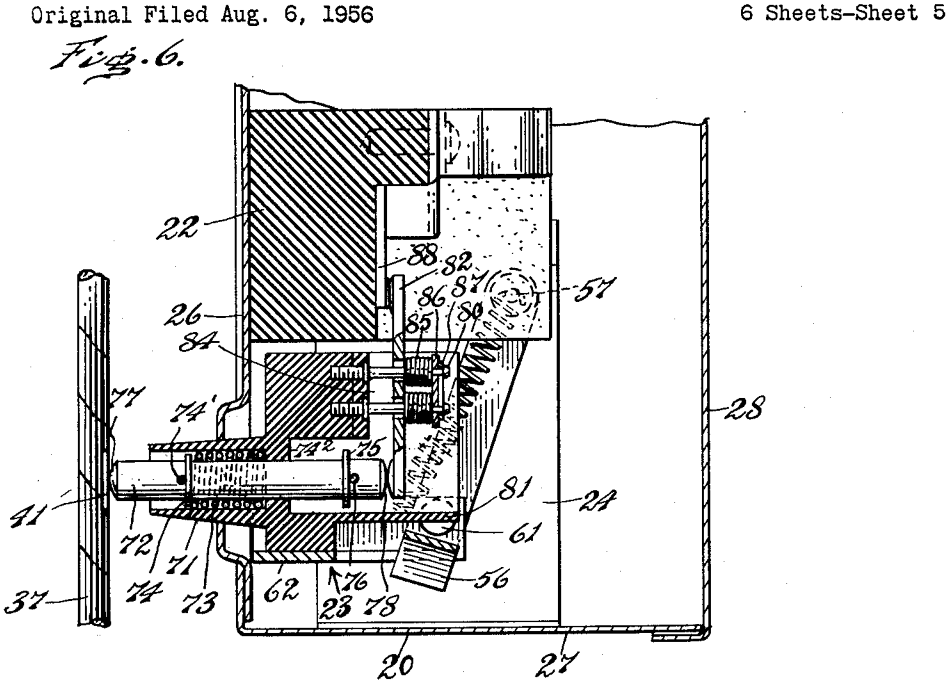
FIGURE 6 is a fragmentary section on the line 6—6 of FIGURE 1.

The back wall is provided with support angles 31, which are adapted to be engaged by threaded attachment clamp 32 for interconnection with a suitable bus duct structure, as shown in FIGURE 5, which may desirably comprise opposed generally U shape bus duct metallic housing element 33, united by bolts 34, and including at spaced intervals straps 35 which engage and hold bus duct insulator elements 36 which receive and support bus bars 37 grouped in pairs. The bus bars of the pairs are separated by insulators 38 between the pairs. The bus bars are suitably wrapped with insulation 40. At plug-in points 41 each one of the bus bars at the outside has the insulation removed, and since in the wiring there will be one bus bar at each side belonging to each one of the phases, it will be possible to connect to all phases from either side. At points corresponding to those at which the bus bars have insulation locally removed, there are openings 42 in the busway housing, covered at the inside by safety slides 43, the safety slides being guided and retained by guiding rivets 44 which extend through longitudinal slots 45 in the housing halves.

The slides at positions which correspond with the position of the opening when the slides are closed carry slide interlock pins 46, which in closed position are urged by leaf springs 47 into holes 48 at the outside of the busway housing.

When the busway slide is deflected, an opening 50 in the slide aligns with the opening 42 in the outside of the busway housing and provides access to the interior.

The plug-in enclosure on its bottom plate carries safety deflecting pins 51 which project into the holes 48 and deflect the slide interlock pins 46, so as to permit the slide to move laterally. The safety pins 51 have annular grooves 52 beneath the heads, and when the pins 51 are in engagement with the busway and the slide is moving laterally to the slide-open position, the narrow portions of walls 53 of slots 54 in the slide interlock in the grooves 52 and prevent removal of the plug-in device. The slide is suitably manipulated when the plug-in device has deflected the interlock pins, by inserting a screw driver or the like through one of the slots 45 to engage a suitable opening in the slide.

The clamps 32 engage in lateral slots 55 in the busway housing to retain the plug-in device in place.

With the plug-in device attached on the busway, and the slide of the busway laterally deflected, it is then possible to gain access by the primary contacts with the bus bars, using the mechanism now to be described.

The contact carrier assembly comprises a suitably metallic yoke 56 which is pivoted at its outer ends by pins 57 mounted on the pantograph supports, which are secured to lateral walls of the enclosure by engagement of flanges 58 and 60 suitably by spot welding. The yoke 56 near its base is pivotally connected at 61 to a suitably metallic support bracket 62, which is itself of yoke formation and has a bottom flange 63 which interconnects with and mounts a contact insulator supporting element 64. The arms of the yoke 56 are in parallel or suitably in pantograph relation with links 65 at the opposite ends respectively pivoted at 66 to the support bracket of the insulator and at 67 to the pantograph support.

A helical tension spring 68 is interconnected at one end with the pivot 57 and at the other end with an opening 70 in an intermediate position on the insulator support bracket so that the springs can urge the movable contact assembly toward retracting position.

The contact insulator mounting is provided with a plurality of cylindrical insulator housings 71, suitably three, for a three-phase system, extending side by side in spaced relation, each having a bore which corresponds to the longitudinal axis of each bus bar. Primary contact plungers 72 are extendably positioned in each housing, the contact plungers being surrounded by helical compression springs 73 (FIGURE 6) which act in the clearance space between the primary contact plungers and the cylindrical insulator housings 71 between a forward washer 74 acting against pin 74′ forward of the washer and a rear spring abutment washer 75 acting against a rearward pin 76. The rear spring abutment washer in forward position seats on a shoulder $74^2$ at the back of the insulator housing. The extreme end of the primary contact plunger is suitably convex at 77, and desirably provided with a silver or other suitable contact coating. At the opposite or upper end, the primary contact plunger is provided with an arc resistant convex contact surface 78, which functions in connection with the secondary contacts to be explained.

It will be understood that the primary contacts open at both ends when the plug-in device is in open position. When the plug-in device is closed, the effect is first to engage the primary contacts with the bus bars and then to cause the insulating carrier to advance relative to the primary contacts with compression of the helical compression springs 73.

The insulating contact carrier mounts suitably upwardly extending pairs of guiding pins 80 which are positioned in line with the upper ends of the primary contact plungers, and in the middle of arc chambers formed by insulating arc resisting partition walls 81.

A secondary contact bar 82 has openings 83 which pass the guiding pins 80, and is urged toward seating position against an insulating abutment 84 by helical compression springs 85 surrounding the pins and held in place by a spring abutment washer 86 and a spring retainer 87 which engages in notches or grooves in the walls of the pins 80.

It will be evident that the contact bar 82 is a double break contact, one end of which cooperates with the primary contact 72 and the other end of which cooperates with one of fixed contacts 88 which are mounted on the line side insulating fuse block 90, and which carry suitable fuse clips 91. The circuit is completed through suitable fuses (not shown) to fuse clips 92 connecting to terminals 93 mounted on a load side insulator block 94.

For the purpose of manipulating the movable contacts in the preferred form, we provide an operating cam or crank 95 pivoted at 96 to one of the lateral walls of the enclosure. The cam 95 has an arm 98 pivotally connected at 100 to a link 101 which is pivotally connected at 102 to the base of the contact insulator support bracket 62.

Figures 8, 9, 10, 11:
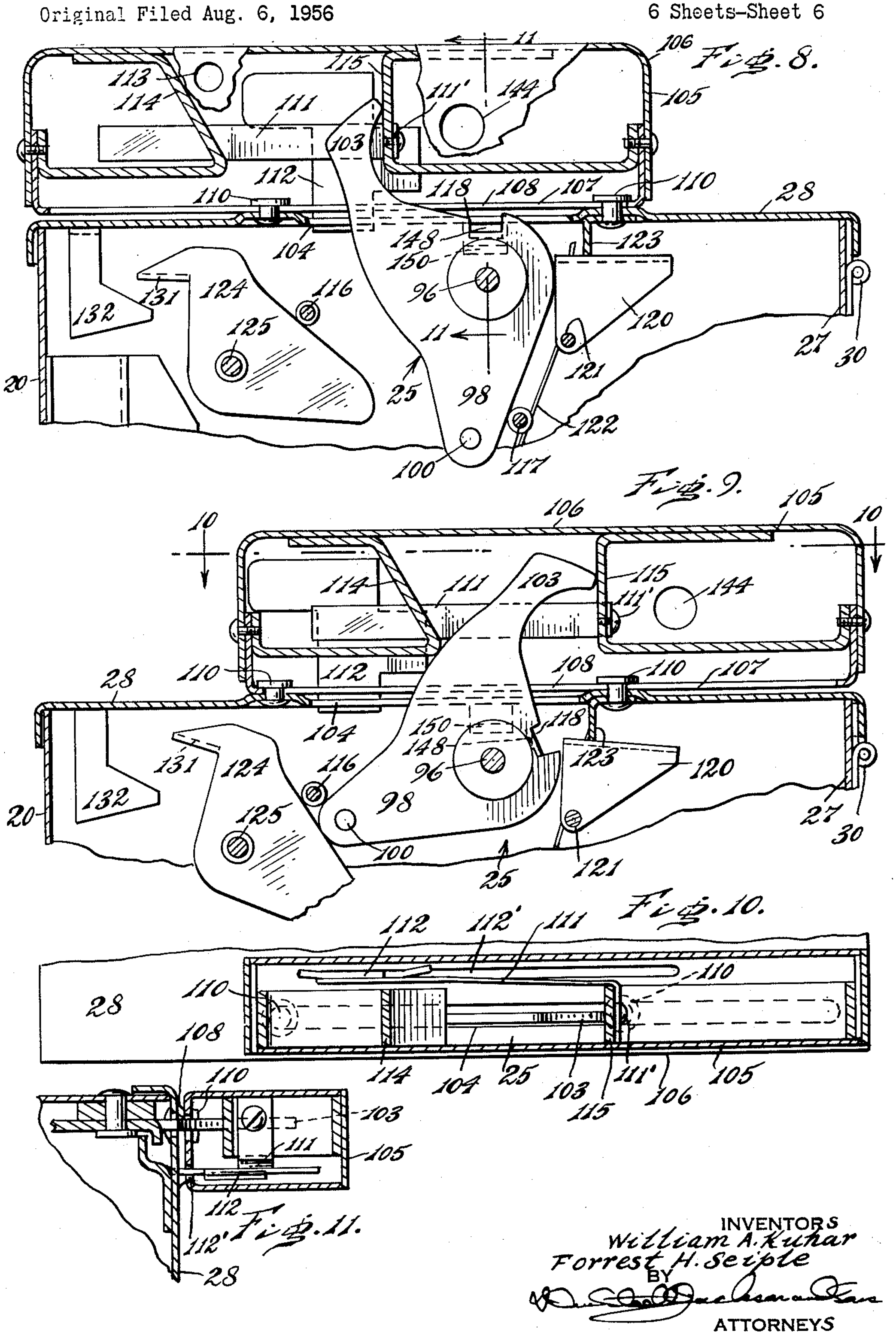
FIGURES 8 to 11 show a modification which constitutes the preferred embodiment.

In the form of FIGURES 8, 9 and 10, the cam end projection 103 in closed position of the cover protrudes through cover slot 104 into the space within the outer casing 105 of handle 106 which has bottom flange elements 107 which form slide groove 108 guided by guiding rivets 110 spaced at opposite ends of the groove and the cover and secured to the cover. The projection 103 also extends through slot 104.

The handle is retained in either one of its limiting sliding positions by a leaf spring 111 secured on the inside of the cover at 111' and which frictionally engages against a notched hasp 112 which protrudes from the outer side of the cover within the handle, and extends through a slot 112' in the bottom of the cover. A hole 113 extends across the sides of the handle and in the opposite limiting position lies on opposite sides of the hasp, permitting extending of a padlock through the hole for locking purposes in either limiting position.

The handle housing has, suitably secured to the top at spaced positions, limiting abutments 114 and 115 which engage the cam projection 103 and permit the movement of the handle to deflect the cam to its opposite limiting positions.

The cam is prevented from excessive angular travel by pins 116 and 117 protruding from the lateral wall and engaging the portion 98.

The cam has a notch 118 which in open position is engaged by interlock 120 pivoted at 121 on one of the lateral walls, and urged toward latching position by torsion spring 122 which is mounted on the pivot pin 121 and which has an arm engaging the abutment 117 and an arm anchored on the interlock. The interlock is deflected by a dog 123 mounted on the inside of the cover, so that when the cover is open it is not possible to deflect the movable contact carrier to engage either the primary or the secondary contacts. When the cover is closed, however, the interlock is moved out of the way of the cam and the cam is free to be manipulated.

A mechanism stop or operation delay device 124 is pivoted at 125 on the adjoining lateral wall, and is urged toward its stopping position by a helical tension spring 126 engaging at one end in a spring notch 127 on the mechanism stop and at the other end on a pin 128 secured to the lateral wall of the enclosure. The mechanism stop includes a stop abutment 130, which when the primary contacts are closed protrudes into the path of the rocker end of the cam, and, when the primary contacts are closed before the secondary contacts are open, engages the rocker arm portion of the cam. The mechanism stop has an abutment 131 which in locking position is engaged underneath by trip bracket 132, so that in case the secondary contacts are open and the primary contacts are closed, opening of the cover will open the primary contacts.

A cover latch 133 is pivoted on a pin 134 on one of the walls of the enclosure, has a latching end 135 which extends through a slot 136 in the cover, and prevents opening of the cover without deflecting the latch. Stop arms 137 engage an abutment pin 138 on the lateral wall and a torsion spring 140 surrounding the pivot pin has one arm 141 engaging the latch and one arm 142 engaging the stop pin.

In operation, starting with the plug-in device detached, the user aligns the pins on the plug-in device with the safety pin openings of the busway, and presses the plug-in device against the busway, deflecting the safety interlock pins. The user next secures the clamps 32 to hold the plug-in device physically in position against the busway housing. Using a screw driver or other suitable tool, the safety slide is deflected to bring the opening in the safety slide into line with the opening in the busway and permit access of the primary contacts to the bus bars.

During all of this procedure, the cover could be either closed or open as the secondary contacts as well as the primary contacts are disconnected.

The operator is now free to make his wiring connections to the load side terminals, suitably bringing the wires through knockouts 143 in the lateral walls of the enclosure. The fuses are then installed.

It is not possible for the operator to complete the closing of the contacts with the cover open. When the cover is closed, the bracket 123 deflects the interlock 120 from the cam, making it possible to manipulate the handle to close the contacts.

At the same time the trip bracket 132 has its hook end in position to lie beneatht the element 131 of the mechanism stop 124 when the mechanism stop is displaced to cam closing position.

Using either the hand or an operating tool engaging in opening 144 in the handle, the handle is slid to its opposite limiting position, and so the cam is deflected to the contact closing position, causes angular relation between the cam rocker arm and the link 101 to throw beyond toggle dead center, and thus tending to hold the contacts in closed position. The sequence of closing is first the engagement of the primary contacts with the bus bars, and then further movement of the movable insulator forward causes the secondary contacts to make their double make respectively with the primary contacts and the fixed contacts.

At the same time, the mechanism stop is free from the deflecting engagement of the rocker arm of the cam, and its stop element is thrown into operating position in the path of the cam. The circuit is now completed and the device is operated.

When the slideable handle is moved to opposite limiting position, the interconnection with the cam throws the cam to position on the other side of the toggle dead center, but the cam is prevented from further reaching its opposite limiting position by engagement of its rocker arm with the mechanism stop. The effect therefore is to permit double break of the secondary contacts, and any arcing which might take place is extinguished at this time.

The arcing takes place and is extinguished by secondary contacts and there is no arcing by the primary contacts. It is now impossible to open the primary contacts unless the cover is open, in which case the trip bracket 132 deflects the mechanism stop, and then allows the cam to return to its fully inactive position, during which time the pantograph arms bring the primary contacts out of engagement with the bus bars.

It should be noted that it is impossible to open the lid when the cam is moved to the position which corresponds with contact closure, because the cam ear 148 is engaged beneath by projection 150 from the lid. In other positions of the cam this interference with opening does not occur.

In some cases it is preferable to use a rotating lever type handle rather than a slideway. This is illustrated in FIGURES 1 to 7. Using this form, the operating handle 152 is secured by a shaft with the cam, and the cam is modified to eliminate any projection through or beyond the cover. The operation is really the same as that already described except that the cam is manipulated by the handle 152.

In view of our invention and disclosure, variations and modifications to meet individual whim or particular need will doubtless become evident to others skilled in the art to obtain all or part of the benefits of our invention without copying the structure shown, and we, therefore, claim all such insofar as they fall within the reasonable spirit and scope of our claims.

Having thus described our invention, what we claim as new and desire to secure by Letters Patent is:

1. A plug-in device for a bus duct, including an insulating movable contact carrier, means for movably mounting the insulating movable contact carrier for forward motion and for retraction, primary contacts mounted on the insulating movable contact carrier and adapted in closed position to engage bus bars, secondary contacts mounted on the insulating movable contact carrier and interconnected with the primary contacts in closed position, and fixed contacts interconnected with the secondary contacts in closed position, in combination with means for advancing the insulating movable contact carrier to a full forward position by a continuous stroke and thereby engaging the secondary contacts and also engaging the primary contacts, an operation delay device, means for moving the operation delay device to stop position when the insulating movable contact carrier is moved forwardly to closed position, means operated from outside the plug-in device for moving the insulating movable contact carrier toward opening until the mechanism engages the operation delay device, and separately operated means, operated from outside the plug-in device, for throwing the operation delay device to release position and thereby opening the primary contacts.

2. A plug-in device of claim 1, in combination with an enclosure around the plug-in device, and a cover movably connected to the enclosure, in which the means for moving the operation delay device to release position includes an interlock with the cover which releases the operation delay device when the cover is thrown open.

3. A plug-in device of claim 2, in combination with interlock means between the cover and the operating mechanism operative only when the primary contacts and secondary contacts are closed, for preventing opening the cover in such position of the contacts.

4. A plug-in device of claim 2, in combination with latch means interconnected with the operating mechanism when the cover is open to prevent forward motion of the insulating movable contact carrier, said latch means being rendered inoperative by closing the cover.

5. A plug-in device of claim 1, in combination with a second set of make and break contacts operating between the secondary contacts and the primary contacts and operated by the movable secondary contacts.

6. A plug-in device including an insulating movable contact carrier, primary contacts movably positioned in the insulating movable contact carrier, spring means urging the primary contacts to forward position with respect to the insulating movable contact carrier, secondary fixed contacts cooperating with the insulating movable contact carrier, double make and break secondary movable contacts in closed position engaging at one end with the fixed contacts and at the other end with the primary contacts, in combination with pantograph mechanism pivotally supporting the insulating movable contact carrier, spring means biasing the pantograph mechanism to open position, a cam, a pivotal support for the cam, pivotal link connection between the cam and the insulating movable contact carrier, functioning as a toggle on opposite sides of its intermediate position, means for throwing the cam to opposite limiting position, an operation delay device having an inactive position and an active position, pivoted means supporting the operation delay device for permitting opening of the pantograph mechanism when the operation delay device is in operative position and for moving the insulating movable contact carrier far enough open only to open the secondary contacts without opening the primary contacts and means cooperating with the operation delay device in its opposite limiting position for opening the primary contacts.

7. A plug-in device of claim 6, in combination with an enclosure having a hinged cover, in which said last means comprises an interlock between the cover and the operation delay device, throwing the operation delay device into inactive position when the cover is opened.

8. A plug-in device of claim 7, in combination with an interlock projection on the cam and an interlock abutment from the cover to the cam when the cam is thrown into closed position for preventing opening of the cover.

9. A plug-in device of claim 8, in combination with a latch recess on the cam, a latch interlock pivotally supported on the enclosure, and preventing closing of the cam when the cover is open, and an abutment on the cover deflecting the latch interlock to inoperative position.

10. In a plug-in unit for a bus duct system, a case having a cover and an opening, said opening being positioned to be in alignment with a duct housing opening when said case is fastened to the duct housing, contact finger means, said contact finger means having a position entirely within the case and a position protruding beyond the case, secondary contact means, means for advancing the contact finger means through the opening in the case beyond the confines of the case and into pressure contact with a bus bar in said duct and retracting said contact finger means from said bus bar and back within the confines of the case, means for bringing said secondary contacts into engagement with one another and separating said secondary contacts from one another, interlocking means for preventing said means for advancing and retracting said contact finger means from retracting operative after said means for opening and closing said secondary contact means has opened said secondary contact means, and means separately operable by the user of the device for releasing said interlocking means.

11. A plug-in unit of claim 10, in combination with interlock means between the means for opening and closing the secondary contact means preventing opening the cover when the secondary contact means are closed.

12. A plug-in unit of claim 10, in combination with interlock means between the means for advancing and retracting the contact finger means and the cover preventing advancing the contact finger means when the cover is open.

13. In a plug-in unit for bus bars; a case having an access opening and a second opening; a cover portion movably mounted on the case and having a closed position relative to the access opening and a wide-open position relative to the access opening; a contact finger movably mounted in the case and having a protruding position in which it protrudes through the second opening out of the case and an inner position in which it is completely within the confines of the case; a pair of inner contacts electrically in series with the contact finger, the inner contacts being relatively movably mounted in the interior of the case and having a closed position in which the inner contacts are together and an open position in which they are separated; means, including a first-mentioned control operable by the user from outside of the case, for operating the inner contacts from closed to open position; means, including a second-mentioned control, for operating the contact finger from its protruding position to its inner position when and only when the second-mentioned control is operated, said second-mentioned control being separate from the first-mentioned one and being separately operable by the user outside of the case, and said second-mentioned control being included in the cover portion, said second-mentioned control being out of position for the contact finger to be thus operated when the second-mentioned control is in wide-open position; and means for preventing said operation of the second-mentioned control until after the inner contacts have been operated from closed to open position by the first-mentioned means.

14. In a plug-in unit for bus bars, in combination, a cabinet having walls and an openable cover, contact members movable through an opening in one wall of the cabinet to engage bus bars, circuit interrupting means disposed inside the cabinet and connected in series-circuit relation with said contact members, an actuating member mounted on another wall of the cabinet for actuating the contact members, interlocking means for controlling the operation of said actuating member to prevent disengaging said contact members from the bus bars while the circuit interrupting means is conducting current, and means carried by the cover for actuating said interlocking means.

15. In a plug-in unit for bus bars, in combination, a cabinet having walls and an openable cover, contact members movable through an opening in one wall of the cabinet to engage bus bars, circuit interrupting means disposed inside the cabinet and connected in series-circuit relation with said contact members, an actuating member mounted on another wall of the cabinet for actuating the contact members, interlocking means for controlling the operation of said actuating member to prevent disengaging said contact members from the bus bars while the circuit interrupting means is conducting current, means carried by the cover for actuating said interlocking means, and additional means carried by the cover and cooperating with said actuating member to prevent opening the cover while the circuit interrupting means is conducting current.

References Cited in the file of this patent

UNITED STATES PATENTS 2,786,908 Constantine et al. -------- Mar. 26, 1957